Aug. 15, 1944.   W. W. LOEWY   2,355,810
METHOD AND MEANS OF PEELING GRAIN
Filed Nov. 1, 1941
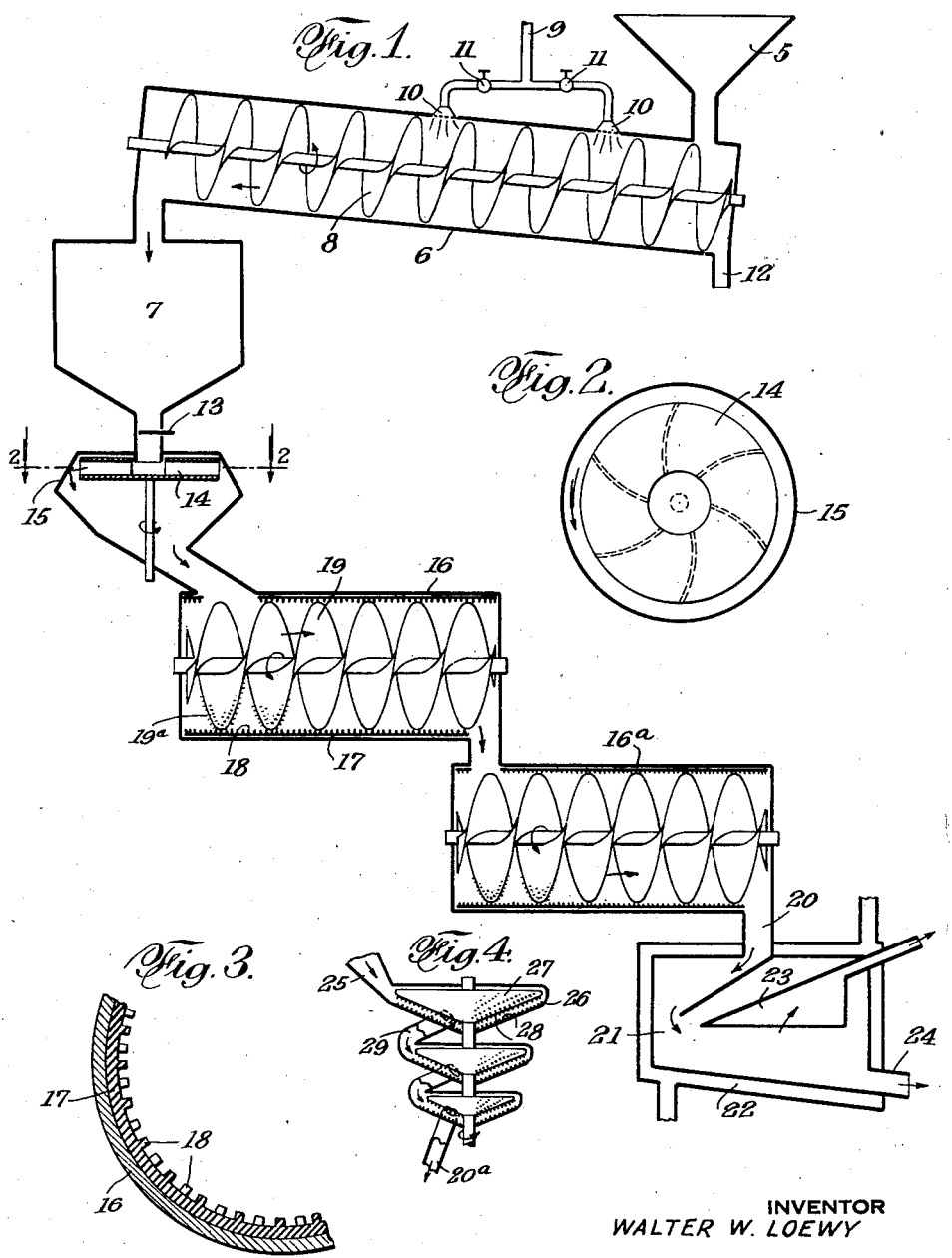
INVENTOR
WALTER W. LOEWY
BY Leon M. Strauss Patented Aug. 15, 1944

2,355,810

UNITED STATES PATENT OFFICE 2,355,810

METHOD AND MEANS OF PEELING GRAINS

Walter W. Loewy, New York, N. Y.

Application November 1, 1941, Serial No. 417,443

5 Claims. (Cl. 83—94)

This invention relates to processing grain and the like and to apparatus for carrying out such process.

While the invention may be effectively employed for processing other grains such as maize and rye and certain legumous seeds such as peas, the process and means herein disclosed is particularly effective for treating wheat.

Grains, corns and seeds above mentioned have an epidermis covering over the kernels there of and, previously, these kernels together with their cover were milled to prevent loss of gluten and minerals. However, the meal or flour thus produced, contained this epidermis in finely divided form. This epidermis, being pure cellulose, contributed nothing to the flour and nutritive value of the meal or flour but, in fact, impaired the quality thereof because of its indigestibility by both humans and live stock. Moreover, said epidermis, usable as a valuable by-product, was lost by incorporation into the milled product.

It has been found that removal of the epidermis, but without injury to the kernel of the grain or seed, will not impair the peeled kernel which will retain all of its gluten, and other valuable substances and will yield a meal or flour lighter and brighter in color, carrying less ash, and having superior baking qualities.

One of the objects of the present invention is, therefore, to provide a novel method comprising the steps of first loosening the epidermis coverings on the grain kernels by subjecting the surface wettened coverings of the kernels to tumbling and subsequent shock action to split the coverings open and then imparting friction to the thus loosened and split coverings, thereby peeling the epidermis coverings from kernels of grain and the like or legumous seeds without destruction or impairment of said kernels or seeds.

The present method further contemplates treating grain kernels and legumous seeds whereby they are thoroughly peeled, remain substantially entirely whole, receive a well polished appearance, and are ready for milling to provide a pure, clean and wholly digestible meal or flour.

The instant method also contemplates the collecting of the peeled epidermis for sale and use as a valuable by-product.

The accompanying drawing, in a diagrammatic manner, illustrates apparatus for carrying out the present method, and in particular the means employed for performing the various steps of the method. Hence, the illustrated embodiment should be considered as by way of example only. The following specification, which has basis on the drawing will deal with the treating of wheat, it being obvious how other grains and seeds may be similarly treated. The apparatus shown may be incorporated into a complete milling plant by introduction thereof between the preliminary cleaning and washing stages and the mill grinders to provide for a continuous and uninterrupted conversion of the wheat into meal or flour.

In the drawing—

Fig. 1 is a diagrammatic view of apparatus for peeling the epidermis covering from wheat and for separately collecting the peeled wheat kernels and the cellulosic peelings or coverings.

Fig. 2 is a plan sectional view through a portion of the apparatus as taken on the line 2—2 of Fig. 1.

Fig. 3 is a fragmentary cross-sectional view, at an enlarged scale, through means for removing the epidermis from the treated kernels.

Fig. 4 is a diagrammatic vertical sectional view illustrating alternate peeling means.

Before the wheat is treated according to the present method, it is thoroughly cleaned in conventional machines to rid it of impurities, weeds and iron particles. It may be brushed and washed, if desired, but care must be taken that the grains carry only such moisture at the surface of their epidermis coverings as it suitable for carrying out the present process. Preferably the wheat comes to the instant apparatus moisture-free or practically so.

The cleaned wheat is fed to the hopper 5 to fall into the conveyor housing 6 in which the wheat is fed slowly toward a collecting bin 7 as by means of a feed screw 8. During this feed, the wheat is wetted with cold or lukewarm water passing through a pipe 9, through one or more sprayheads 10, into the conveyor housing 6 the wheat or grain material and water moving in counter-current relation in said housing 6.

Valves 11 are provided to regulate the flow of water in accordance with the condition of the wheat; hard wheat needing more moisture and soft wheat, less. The moisture content of the wheat is also a factor in determining the rate of water supply. If desired, solvents may be incorporated in the water to aid loosening of the epidermis coverings on the wheat kernels, or ingredients having disinfectant properties may be used to clean the wheat still further.

The rate of feed of the screw 8 is kept quite low to provide sufficient time for uniform surface wetting (or damping) of the wheat and to allow for drainage therefrom of excess moisture before dropping into the bin 7. An outlet 12 is provided for ridding the conveyor means of such excess moisture.

The bin 7 may be of such size as to afford continuous passage therethrough of the surface wetted wheat and yet allow for sufficient time for the moisture to take effect upon the epidermis. A valve or gate 13 may control such passage. The bin 7 may be employed as a storage chamber to hold the wheat until ready for the next step in the process at which time the gate 13 is opened to permit discharge of the wheat into an apparatus for subjecting the wheat to shock.

This novel step is employed for cracking the epidermis coverings without however crushing or disrupting the kernels themselves. This step in the process may be accomplished by dropping the wetted wheat upon a hard vibrating surface, or, as shown, centrifugally propelling the wheat against a wall or the like. For this purpose a propeller 14 receives the wheat from the bin 7, said propeller being rotated at a high speed to throw and roll upon one another the wheat kernels with some force against the wall 15. The speed of the propeller may be regulated to afford a shock which will split the epidermis coverings of the wheat kernels without impairment of said kernels.

The wheat kernels, with their epidermis thus split, are then directed to a peeling apparatus such as the drum 16.

In its present conceived form this drum is preferably lined with a rubber or composition inner wall 17 having projections such as shown at 18. These projections or roughenings may be relatively coarse at the receiving end and somewhat finer at the discharge end or two or more such drums may be used, the subsequent ones having finer projections or roughenings as in the drum 16a. Also, the inner linings may vary in hardness, being most hard at the receiving end and less so at the discharge end. The lining may be interchangeably attached to the wall of the drum, be shaped to natural form of the grain and peeling conditions thereof and made of deodorized rubber, rubber composition or similar friction producing material.

In addition to the mentioned roughened rubber lining, bristles, either rubber, animal or synthetic, may be employed in the matter of a brush for further cleaning of the kernels.

Means, such as a screw 19, may be provided for feeding the wheat through each drum. Said means preferably incorporates paddles or blades for efficatiously tumbling the wheat whereby it is directed against the projections 18 to utilize the resultant friction which peels the epidermis from the kernel. The speed of the screw may be regulated to afford sufficient time for this step in the process which may be carried out in one or more drums as indicated.

The feed means 19 may also be covered with a roughened rubber lining as at 19a to afford additional epidermis peeling surfaces.

During the tumbling of the wheat, friction generated among the kernels also assists in peeling said kernels. Further time may be allowed during this step to permit the kernels to polish each other and to thoroughly rid them of small clinging particles of epidermis.

If the peeling step is arranged serially as illustrated the first drum may receive an additional water spray at its receiving end to facilitate the peeling operation. While the wheat is being peeled, drying thereof may be instituted by admitting to the discharge end of drums 16 or 16a, a supply of fresh air and circulating said air to cause it to draw off moisture.

The apparatus may be so arranged and timed that when the peeling step is ended the passage 20 will receive clean and polished kernels of wheat and the separated peelings thereof. This passage may conduct these two products to a drying and separating chamber 21 which may be heated as by a steam jacket 22 or in other suitable ways.

This latter chamber may be provided with a suction head 23 for drawing off the peeled epidermis for separate collection and storage and with a sloping bottom whereby the polished kernels may pass through the opening 24 to the milling grinders.

The peeling means 16 and 16a may be varied. For instance, as shown in Fig. 4, the kernels may be discharged (from a shocking device) into the chute 25 from which they pass into a preferably funnel-shaped chamber 26 in which is disposed a conical disc 27. Both the chamber and disc are provided with rubber projections or roughenings 28 whereby the kernels are engaged therebetween to be peeled by the friction generated by the relative movement of said chamber walls and disc. The entrance chute 25 and the discharge passage 29 may be so arranged as to afford substantially a full traverse of the kernels around the inner perimeter of said chamber so that ample time is afforded for prolonged contact with the projections or roughenings 28. One such peeling device may be used. According to requirements, it is also possible for removal of the epidermis to employ two or more such units or devices as shown in Fig. 4. They may be relatively smaller as shown and provided with progressively finer peeling surfaces as herein before described. The discharge chute 20a may be connected to a heating and separating unit 21.

By the above described method and means, the wheat is peeled and polished and complete separation of the kernel and epidermis afforded without disruption of said kernels. A valuable by-product—pure cellulose—is obtained, and clean wholesome wheat, resulting in commensurately superior meal or flour, provided.

It is to be noted that the length and the number of drums and particularly the length of the respective rubber coverings within the drums depend on the effectiveness of the peeling to be obtained, and also on the nature and texture of the grains to be treated.

The projections or roughenings 18 may be so shaped and arranged as to search out all portions of the kernels including the clefts therein to insure entire removal of the epidermis.

Polishing of the peeled kernels may be accomplished as a separate operation instead of depending upon such results being obtained during peeling.

As before indicated, it is well understood, the invention may be practiced in various ways without departing from the spirit and scope of the appended claims.

Having thus described the invention what is claimed as new and desired to be secured by Letters Patent is:

1. In the process of removing the epidermis coverings from grain kernels; the steps of feeding grain in opposed direction to the flow of a liquid spray, regulating said spray so as to solely provide surface damping or wetting action on the coverings of said grain, collecting said grain and allowing said damping action to take effect on said coverings and to loosen the latter, subjecting thereafter said grain to tumbling and subsequent shock treatment whereby said loosened coverings are split open, forwardly moving the grain with the coverings thus split while subjecting the latter to peeling action, and separating the coverings from the peeled kernels of the grain.

2. The process of hulling grain, seeds and like kernel material which consists in surface wettening said kernels by feeding said kernels to a liquid medium while directing said kernels and liquid in counter-current relation to drain off the liquid, thereafter moving said surface wettened kernels to store the same thereby allowing said coverings to loosen and soften, then directing said kernels substantially perpendicularly to the direction of feeding thereby subjecting them to rolling action and subsequent impact to split their coverings, then applying friction to said kernels to remove the coverings from the kernels, and finally separating the said kernels and the removed coverings.

3. The process of removing the coverings from grain, seeds and like kernel material which consists in surface wettening the coverings only of said kernels by subjecting their coverings to a liquid medium thereby allowing excess of said liquid medium to drain off from said coverings, tumbling said surface wettened kernels upon each other and subjecting the same to impact whereby their coverings are loosened and subsequently split open, thereafter applying frictional rubbing action to said coverings to peel the latter from the kernels, drying the kernels removed from said coverings, and separating said kernels and said removed coverings.

4. In the process of removing the coverings from grain, seeds and like kernel material, the steps of first loosening the coverings of said kernels by subjecting solely surface wettened kernels and coverings to tumbling and subsequent impact action to split said coverings open, then applying frictional rubbing action to the thus loosened and split coverings to peel the latter from said kernels, and causing said kernels to rub against each other to polish said kernels freed from said coverings while said kernels are being collected.

5. Apparatus of the character described comprising means for wetting grain kernel, seed and the like, means arranged for moving said kernels in counter-current relation to said wetting means to bring about surface wetting of said kernels, means for storing said wetted kernels thereby loosening their coverings, means movably disposed below said storing means for imparting tumbling and subsequent shock action to said kernels to split their coverings open, means arranged for forwardly moving said kernels with split coverings and simultaneously peeling said split coverings, and suction means toward which kernels are moved for separating said kernels freed from coverings and said coverings.

WALTER W. LOEWY.